United States Patent
Taite et al.

(10) Patent No.: US 10,325,382 B2
(45) Date of Patent: Jun. 18, 2019

(54) AUTOMATIC MODIFICATION OF IMAGE PARTS BASED ON CONTEXTUAL INFORMATION

(71) Applicant: Intel Corporation, Santa Clara, CA (US)

(72) Inventors: Shahar Taite, Or Akiva (IL); Tomer Rider, Naahryia (IL); Shay Pluderman, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 273 days.

(21) Appl. No.: 15/278,889

(22) Filed: Sep. 28, 2016

(65) Prior Publication Data

US 2018/0089506 A1    Mar. 29, 2018

(51) Int. Cl.
*G06T 9/00* (2006.01)
*G06T 11/00* (2006.01)

(52) U.S. Cl.
CPC ............ *G06T 11/00* (2013.01); *G06T 11/001* (2013.01)

(58) Field of Classification Search
CPC ........... G06K 9/00–9/82; G06T 7/0081; G06T 11/00; G06T 11/001
See application file for complete search history.

(56) References Cited

U.S. PATENT DOCUMENTS

| | | | |
|---|---|---|---|
| 9,881,402 B2* | 1/2018 | Sako | G06K 9/00671 |
| 10,049,477 B1* | 8/2018 | Kokemohr | G06T 11/60 |
| 2007/0118290 A1* | 5/2007 | Bieringer | G01S 7/415 |
| | | | 702/3 |
| 2007/0177466 A1* | 8/2007 | Ando | G11B 27/105 |
| | | | 369/13.01 |
| 2008/0161113 A1* | 7/2008 | Hansen | A63F 13/12 |
| | | | 463/42 |
| 2010/0156906 A1* | 6/2010 | Montgomery | G06T 15/205 |
| | | | 345/427 |
| 2014/0279242 A1* | 9/2014 | Staicut | G06Q 30/0623 |
| | | | 705/26.61 |
| 2014/0300633 A1* | 10/2014 | Sako | G06K 9/00671 |
| | | | 345/633 |
| 2015/0234918 A1* | 8/2015 | Becherer | G06F 17/30651 |
| | | | 707/722 |
| 2015/0326708 A1* | 11/2015 | Ginzburg | H04L 51/10 |
| | | | 715/752 |
| 2016/0178905 A1* | 6/2016 | Rider | G06F 3/0489 |
| | | | 345/8 |
| 2016/0191591 A1* | 6/2016 | Rider | G06F 17/30 |
| | | | 709/219 |
| 2016/0307028 A1* | 10/2016 | Fedorov | G06T 11/60 |
| 2017/0256040 A1* | 9/2017 | Grauer | H04N 1/00196 |
| 2017/0262994 A1* | 9/2017 | Kudriashov | G06T 7/0081 |

(Continued)

*Primary Examiner* — Sean T Motsinger
(74) *Attorney, Agent, or Firm* — Jordan IP Law, LLC

(57) ABSTRACT

A contextual image manipulation apparatus may include an image part identifier to identify a part of an image, an information collector to collect information from at least one external source, a context identifier communicatively coupled to the information collector to determine contextual information from the collected information and at least one other contextual source, and an image manipulator communicatively coupled to the image part identifier and the context identifier to alter a feature of the image part based on the contextual information.

24 Claims, 7 Drawing Sheets

(56) References Cited

U.S. PATENT DOCUMENTS

2018/0061052 A1* 3/2018 Bedi ............... G06F 3/0488
2018/0089506 A1* 3/2018 Taite ............... G06T 7/0081
2018/0124144 A1* 5/2018 Gonzalez .......... H04L 65/60

* cited by examiner

AUTOMATIC MODIFICATION OF IMAGE PARTS BASED ON CONTEXTUAL INFORMATION

TECHNICAL FIELD

Embodiments generally relate to image manipulation. More particularly, embodiments relate to automatic modification of image parts based on contextual information.

BACKGROUND

Digital photo frames are used widely for showing alternating photos from different types of sources. A smart-television/TV or dumb TV with a set top box like an APPLE TV may also be used as a digital photo frame. A digital image display may be mounted on a wall instead of an ordinary picture or painting. For example, people can pre-define their own photos for display, use some sort of collection or have the displayed images crowd-sourced (similar to the GOOGLE CHROMECAST landing page). Slideshow type features may also be found on computers and smart phones with the images for the slideshow appearing on the displays of those devices.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
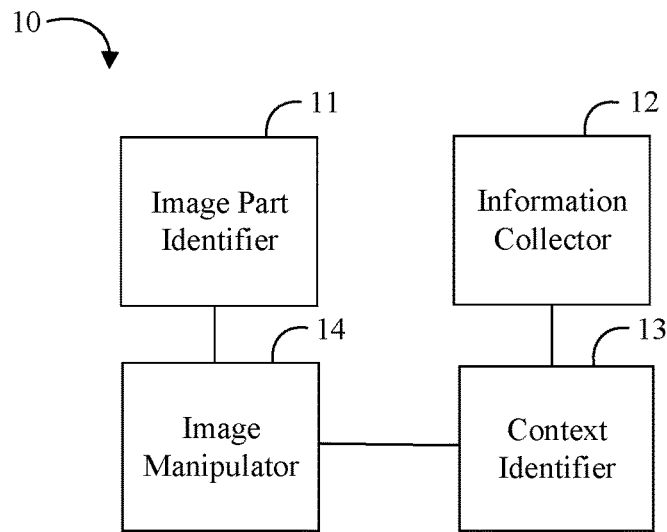
FIG. 1 is a block diagram of an example of an image manipulator apparatus according to an embodiment.

Turning now to FIG. 1, an embodiment of contextual image manipulation apparatus 10, may include an image part identifier 11 to identify a part of an image, an information collector 12 to collect information from at least one external source, a context identifier 13 communicatively coupled to the information collector 12 to determine contextual information from the collected information and at least one other contextual source, and an image manipulator 14 communicatively coupled to the image part identifier 11 and the context identifier 13 to alter a feature of the image part based on the contextual information.

Figure 2:
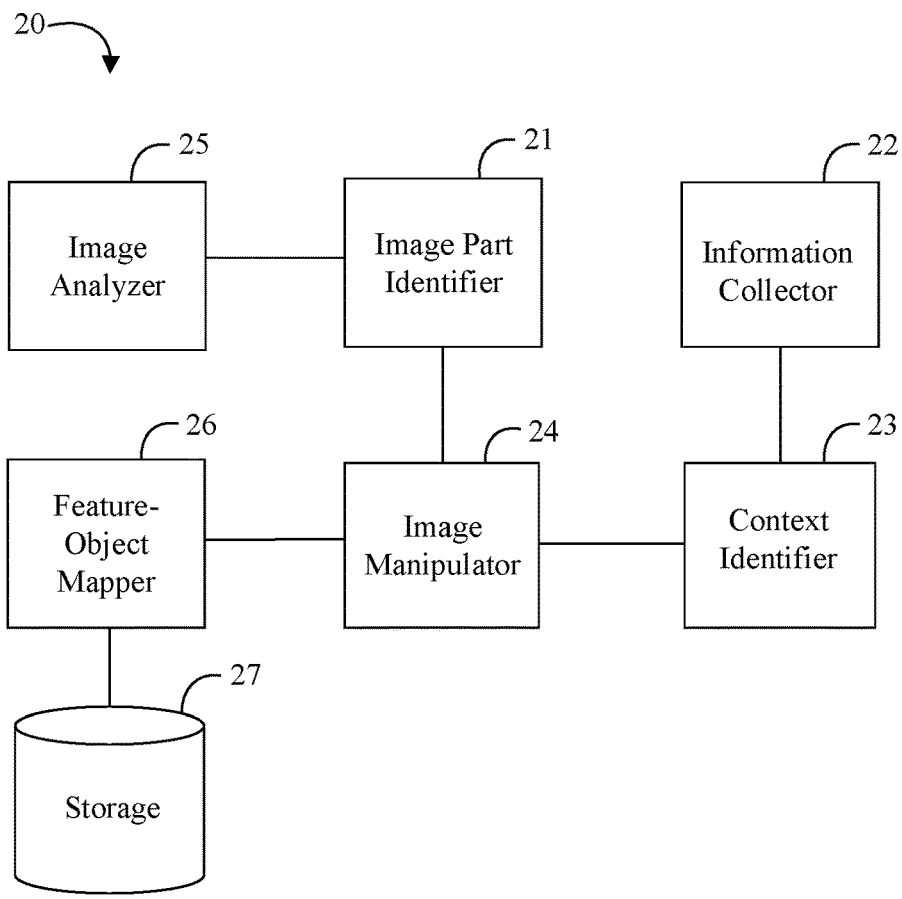
FIG. 2 is a block diagram of another example of an image manipulator apparatus according to an embodiment.
Figure 3A:
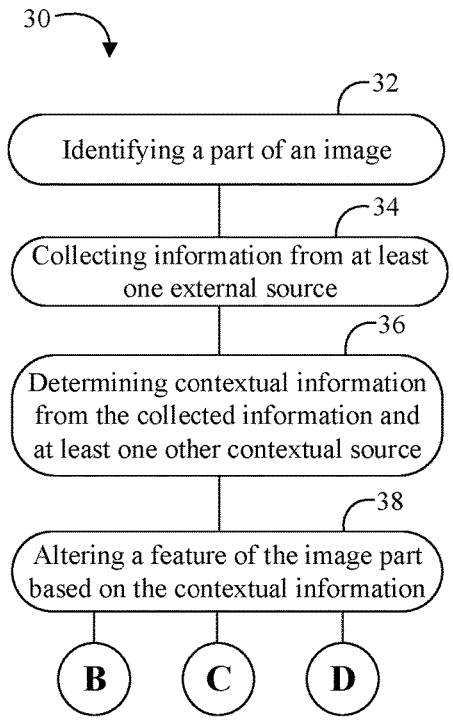
FIGS. 3A to 3D are flow diagrams of an example of a method of manipulating an image according to an embodiment.
Figure 3B:
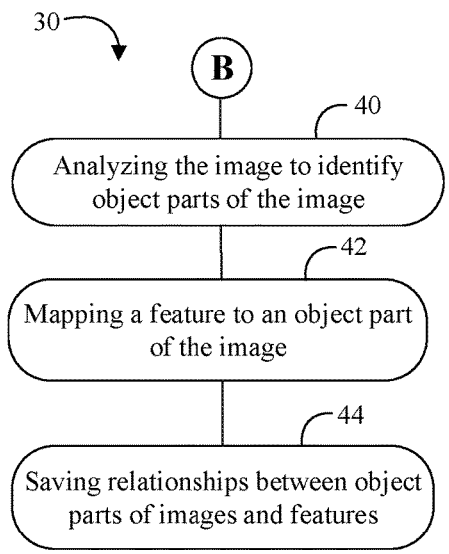
Figure 3C:
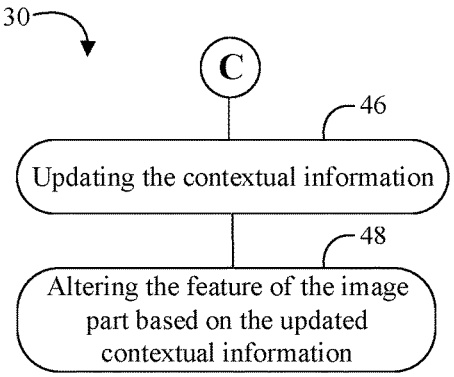
Figure 3D:
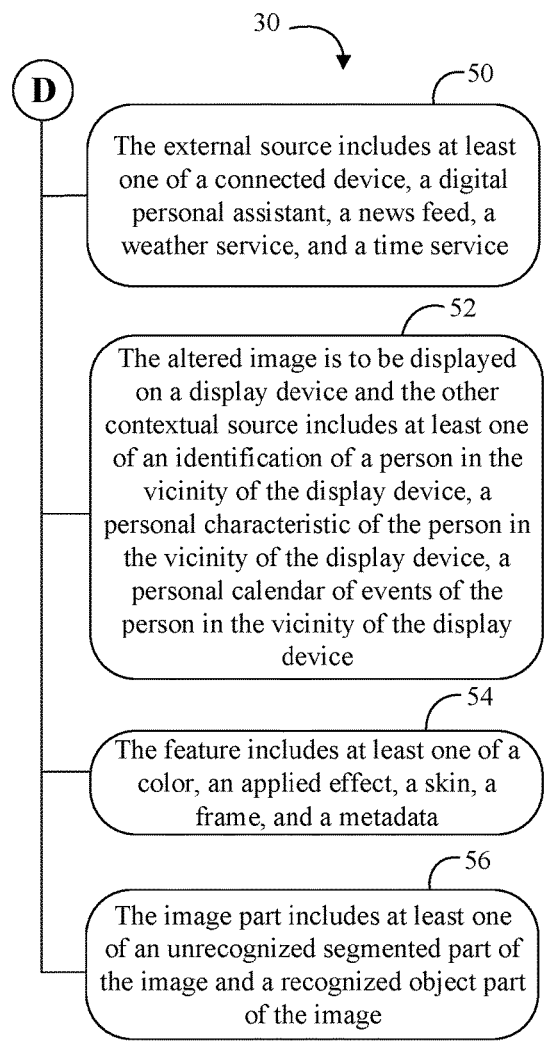

Turning now to FIG. 2, an embodiment of contextual image manipulation apparatus 20, may include an image part identifier 21 to identify a part of an image, an information collector 22 to collect information from at least one external source, a context identifier 23 communicatively coupled to the information collector 22 to determine contextual information from the collected information and at least one other contextual source, and an image manipulator 24 communicatively coupled to the image part identifier 21 and the context identifier 23 to alter a feature of the image part based on the contextual information. The apparatus 20 may further include an image analyzer 25 communicatively coupled to the image part identifier 21 to analyze the image to identify object parts of the image, and a feature-object mapper 26 communicatively coupled to the image manipulator 24 to map a feature to an object part of the image. Some embodiments of the apparatus 20 may further include a storage structure 27 communicatively coupled to the feature-object mapper to save relationships between object parts of images and features.

In any of the above image manipulation apparatuses 10 and 20, for example, the context identifier 13, 23 may be further to update the contextual information, and the image manipulator 14, 24 may be further to alter the feature of the image part based on the updated contextual information. For example, the external source may include one or more of a connected device, a digital personal assistant, a news feed, a weather service, or a time service. In any of the above examples, the altered image may be to be displayed on a display device and the other contextual source may include one or more of an identification of a person in the vicinity of the display device, a personal characteristic of the person in the vicinity of the display device, or a personal calendar of events of the person in the vicinity of the display device. For example, the altered feature may include one or more of a color, an applied effect, a skin, a frame, or a metadata. For example, the image part may include one or more of an unrecognized segmented part of the image or a recognized object part of the image.

For example, each of the above image part identifier, information collector, context identifier, image manipulator, feature-object mapper, and storage structure may be implemented in configurable logic such as, for example, programmable logic arrays (PLAs), field programmable gate arrays (FPGAs), complex programmable logic devices (CPLDs), or in fixed-functionality logic hardware using circuit technology such as, for example, application specific integrated circuit (ASIC), complementary metal oxide semiconductor (CMOS) or transistor-transistor logic (TTL) technology, or any combination thereof. Alternatively or additionally, these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the modules may be written in any combination of one or more operating system applicable/appropriate programming languages, including an object oriented programming language such as JAVA, SMALLTALK, C++ or the like and conventional procedural programming languages, such as the "C" programming language or similar programming languages.

Turning now to FIGS. 3A to 3D, an embodiment of a method 30 of manipulating an image may include identifying a part of an image at block 32, collecting information from at least one external source at block 34, determining contextual information from the collected information and at least one other contextual source at block 36, and altering a feature of the image part based on the contextual information at block 38. The method 30 may further include analyzing the image to identify object parts of the image at block 40 and mapping a feature to an object part of the image at block 42. For example, some embodiments of the method 30 may further include saving relationships between object parts of images and features at block 44. Some embodiments of the method 30 may further include updating the contextual information at block 46, and altering the feature of the image part based on the updated contextual information at block 48.

For example, in some embodiments of the method 30 the external source may include one or more of a connected device, a digital personal assistant, a news feed, a weather service, or a time service at block 50. The altered image may be to be displayed on a display device and, in some embodiments of the method 30, the other contextual source includes one or more of an identification of a person in the vicinity of the display device, a personal characteristic of the person in the vicinity of the display device, or a personal calendar of events of the person in the vicinity of the display device at block 52. For example, the feature may include one or more of a color, an applied effect, a skin, a frame, or a metadata at block 54. For example, the image part may include one or more of an unrecognized segmented part of the image or a recognized object part of the image at block 56.

The method 30 may generally be implemented in an apparatus such as, for example, the contextual image manipulation apparatus 10 or 20 (see FIGS. 1 and 2), already discussed. More particularly, the method 30 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 30 may be written in any combination of one or more operating system applicable/appropriate programming languages, including an object oriented programming language such as JAVA, SMALLTALK, C++ or the like and conventional procedural programming languages, such as the "C" programming language or similar programming languages.

For example, an embodiment may include at least one computer readable storage medium comprising a set of instructions, which when executed by a computing device, cause the computing device to identify a part of an image, collect information from at least one external source, determine contextual information from the collected information and at least one other contextual source, and alter a feature of the image part based on the contextual information. The at least one computer readable storage medium may include a further set of instructions, which when executed by the computing device, cause the computing device to analyze the image to identify object parts of the image, and map a feature to an object part of the image. The at least one computer readable storage medium may include a further set of instructions, which when executed by the computing device, cause the computing device to save relationships between object parts of images and features. The at least one computer readable storage medium may include a further set of instructions, which when executed by the computing device, cause the computing device to update the contextual information, and alter the feature of the image part based on the updated contextual information. For example, the external source may include one or more of a connected device, a digital personal assistant, a news feed, a weather service, or a time service. The altered image may be to be displayed on a display device and the other contextual source may include one or more of an identification of a person in the vicinity of the display device, a personal characteristic of the person in the vicinity of the display device, or a personal calendar of events of the person in the vicinity of the display device. The feature may include one or more of a color, an applied effect, a skin, a frame, or a metadata. The image part may include one or more of an unrecognized segmented part of the image or a recognized object part of the image.

As noted above, digital picture displays are in widespread use. However, when an image is displayed, it isn't modified in any way to suit any contextual situation. Advantageously, a digital picture display device according to some embodiments may provide automatic modification of image parts based on contextual information. For example, some embodiments may provide a mechanism enabling online modification of a presented digital image according to contextual information.

Advantageously, a method of manipulating an image according to some embodiments may include identifying different parts of an image displayed at home by a digital photo frame or other mechanism, and altering their colors or other features according to contextual information gathered from multiple sources being the mood, home and world events, weather conditions, time of day, etc. For example, the parts themselves could be recognized using object recognition technology and could be altered according to their being with respect to context. An aspect of object recognition according to some embodiments may include analyzing metadata attached to the image file (e.g. keyword tags, location data, date/time data) to aid or facilitate recognition (for example a keyword tag of Monument together with GPS data of Washington, D.C. may result in an object part being identified as the Washington Monument). Object recognition may be performed on-the-fly, may be performed in advance with the results stored as metadata attached to the image file and/or stored in a data structure associated with the image, or any combination thereof.

Altered features may include any of colors, applied effects, skins, frames and metadata. Non-limiting examples of applied effects may include filters, posterize, gradient, blur, focus, distort, noise, pixelate, feather, and texture applied to the image part. For example, skins may include an overlay to apply to the image part. For example, frames may include a treatment of detected edges of the image part such as an outline. For example, metadata may include tags, keywords, location data, time data, vector data, and other non-image information that may be stored with the image file. For example, vector data corresponding to detected edges of segmented parts and object parts may be added to the metadata of an image file or a separate associated data structure. The vector data may be utilized as a mask or outline area for altering the corresponding image part.

Figure 4A:
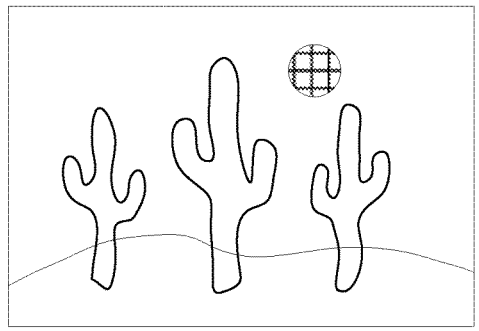
FIGS. 4A to 4F are illustrations of an example of a manipulation of an image of a landscape according to an embodiment.
Figure 4B:
Figure 4D:
Figure 4C:
Figure 4E:
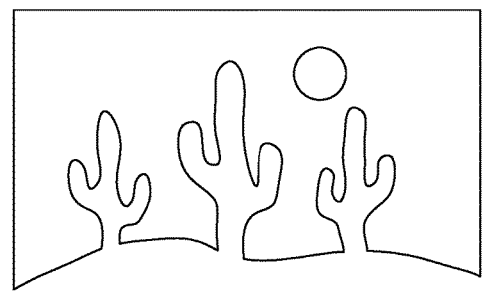
Figure 4F:
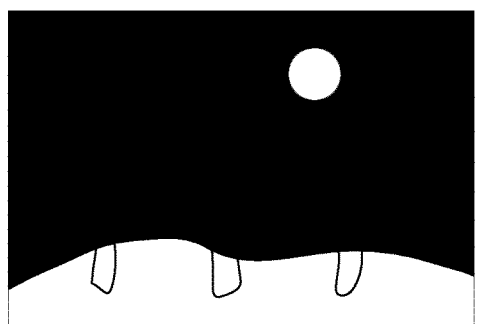

Turning now to FIGS. 4A through 4F, an example of a use case according to an embodiment may include altering an image with un-recognized image parts. FIG. 4A generally illustrates a landscape image including, nominally, tan colored sand, green cacti, a yellow sun, and a blue sky. For example, the image may be segmented into different parts (e.g. based on edge detection, a color threshold, etc.). Each part may go through object recognition in order to determine its being for the purpose of alternation with respect to context. In general, a recognized part of the image may be referred to as an object part, while an unrecognized part of the image may be referred to as a segmented part. FIG. 4B illustrates a nominally recognized object part of the image, recognized as the sun. FIG. 4C illustrates another nominally recognized object part of the image, recognized as a cactus. FIG. 4D illustrates a nominally unrecognized segmented part of the image. FIG. 4E illustrates another nominally unrecognized segmented part of the image. FIG. 4F generally illustrates an alteration of the image from 4A, in accordance with an embodiment.

For a nature image, for example, colors of unrecognized segmented parts could be altered according to mood or time of day. For example, FIG. 4A may illustrate an initial image where recognized object parts may include three cacti and the sun, and unrecognized segmented parts include the sand and the sky. In accordance with an embodiment, an information collector may retrieve the current time of day from a time service and a context identifier could determine that the current time of day is after sunset in the vicinity of the display device where the image is currently displayed (or is to be soon displayed). Based on the presence of three cacti and the sun, the context identifier may determine contextual information that the image is a nature image and that it is currently dark outside in the vicinity of the target display device. Based on the contextual information from the context identifier, an image manipulator may alter the unrecognized segmented part from FIG. 4E to be dark (see FIG. 4F). The image manipulator may further alter the recognized object part of the sun (FIG. 4B) to be white (see FIG. 4F, e.g. as a representation of the moon). In another example, a skin may include a representation of moon craters that could be overlaid on the object part identified as the sun (e.g. in addition to altering the sun's color to be white).

In accordance with an embodiment, a user may interact with the image manipulation process to identify unrecognized segmented parts and/or to change the identification of recognized segment parts. For example, through an appropriate user interface, the user may indicate that the unrecognized segmented part from FIG. 4D is sand (or desert, or any other user selected identification) and/or that the unrecognized segmented part from FIG. 4E is sky (or any other user selected identification), thereby changing those segmented parts of the image to object parts of the image. Likewise, the user may change the identification of objects parts (e.g. from the sun to a star, a planet, a balloon, or a beach ball), or remove the identification thereby changing an object part of the image to a segmented part of the image.

Figure 5A:
FIGS. 5A and 5B are illustrations of an example of a manipulation of an image of a tiger according to an embodiment.
Figure 5B:
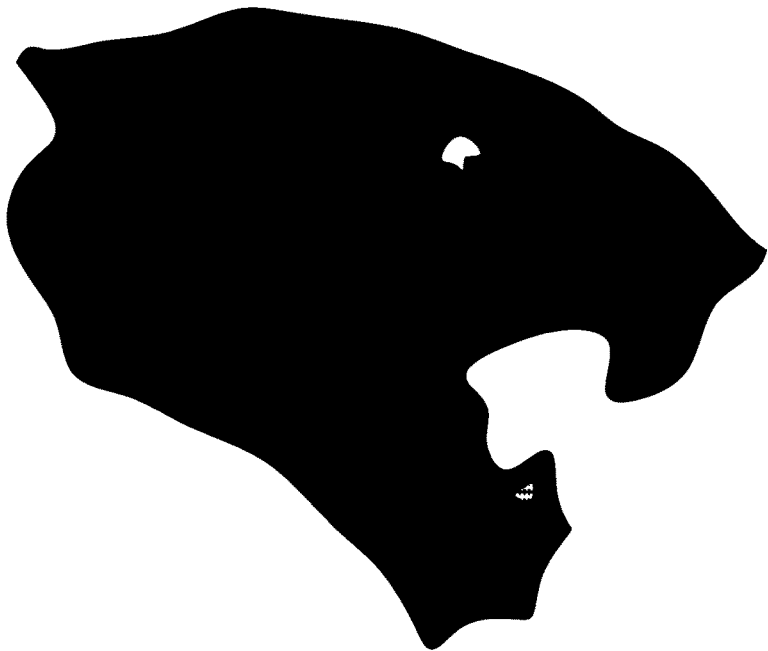

Turning now to FIGS. 5A and 5B, an embodiment may include altering an image with recognized object parts. FIG. 5A illustrates an image of a tiger that might seem threatening to children. In accordance with an embodiment, some parts of the image may be altered to make the tiger seem less threatening when children are around (e.g. as determined by a context identifier). The object parts could specifically be those that are most influential over appearance (in this example, the tiger's mouth and eye may be the most threatening). As shown in FIG. 5B, these parts of the image of the tiger are altered. The eye may be nominally made pink instead of black and the teeth and tongue (which may be recognized collectively as the mouth) may be nominally made blue instead of their respective original colors (presuming those nominal color changes are considered less threatening for the image).

Figure 6A:
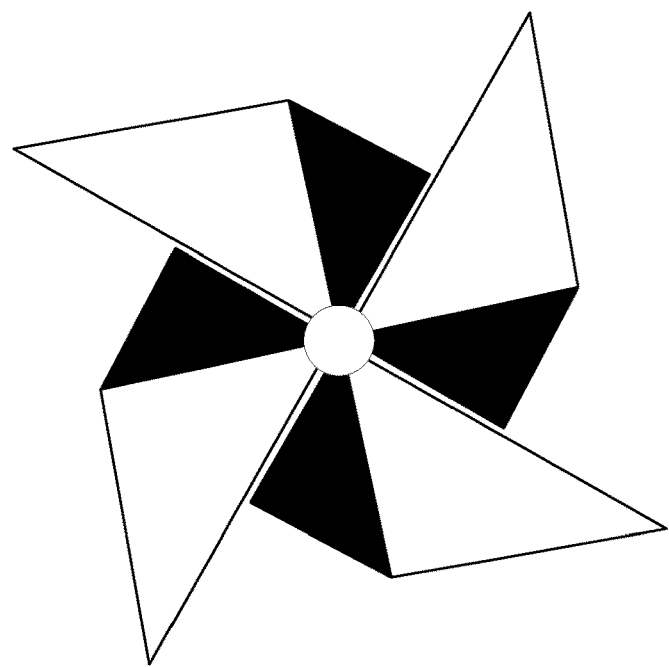
FIGS. 6A and 6B are illustrations of an example of a manipulation of an image of a pinwheel according to an embodiment.
Figure 6B:
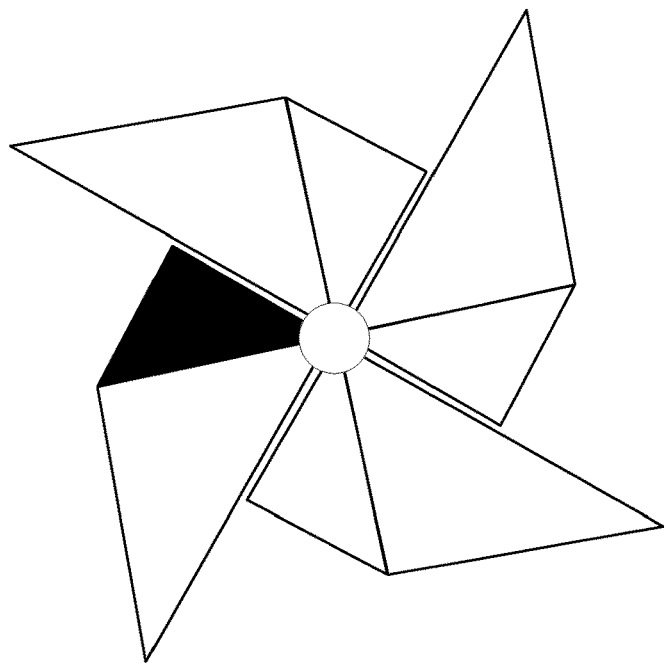

Turning now to FIGS. 6A and 6B, an embodiment may include altering an image based on a current event. For example, during National Coming Out Day an image of a pinwheel (e.g. displayed on a digital picture frame at home) could change its segmented or object part colors from its original colors (FIG. 6A) to colors of a Rainbow Flag (FIG. 6B, with the respective cross hatches nominally representing the respective colors). For example, the alteration may be based on contextual information determined from a person's (e.g. a person in the vicinity of the target display device) grasp of or feeling towards the event, with the contextual information determined in part by information collected from the person's connected devices, digital personal assistant, a personal calendar, and/or a calendar service.

Figure 7A:
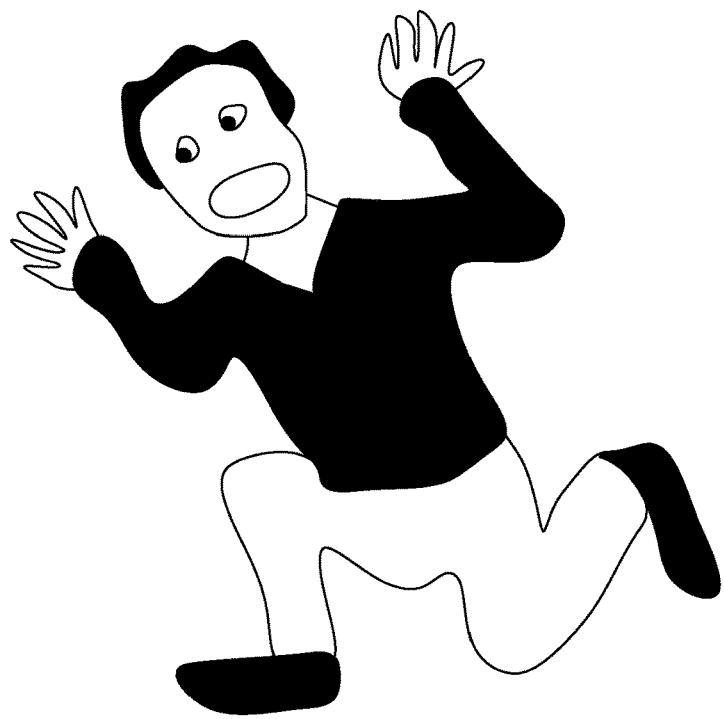
FIGS. 7A and 7B are illustrations of an example of a manipulation of an image of a person according to an embodiment.
Figure 7B:
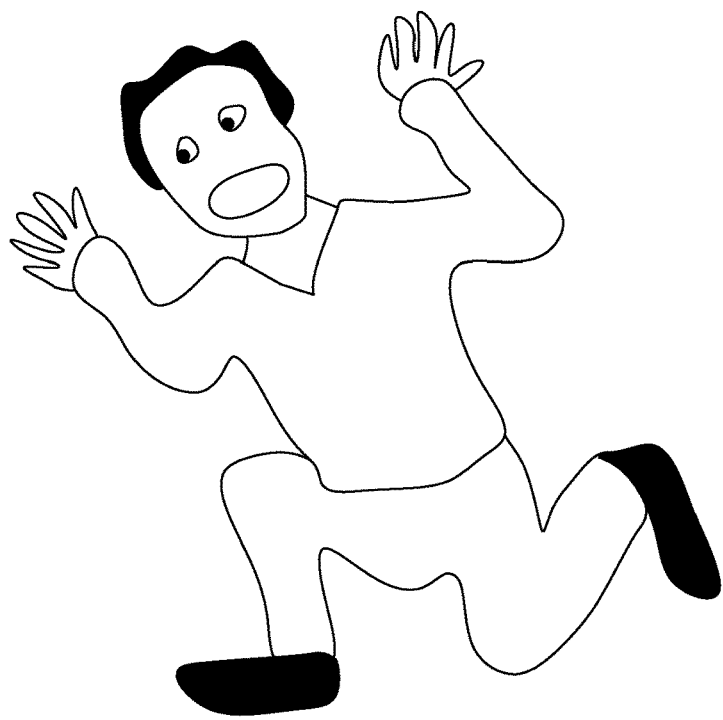

Turning now to FIGS. 7A and 7B, an embodiment may include altering an image based on a news feed. For example, during world cup soccer games, when the US is playing, a picture could alter its colors to fit the American flag. FIG. 7A shows an initial image of a person. Based on information collected from a news feed for sports events, when the US is playing or scores a goal the image may be altered so that recognized objects for the persons face, shirt, and pants are made red, white, and blue, respectively (e.g. as shown in FIG. 7B). For example, rather than change the entire color of the object part(s) the image manipulator may alter an applied effect to one or more of the respective object parts. For example, a red tint may be applied to the face so that the face has a reddish appearance while other features of the face are still recognizable.

Given the benefit of the present specification, numerous other examples will occur to those skilled in the art. Moreover, while various examples have been provided as simple line drawings, embodiments may be applied to photographs or complex images. Those skilled in the art will appreciate that object recognition may be performed on photographs or complex images to identify object parts of those images and/or to identify boundaries of unrecognized segmented parts of those images. For example, ADOBE PHOTOSHOP includes a magic wand feature that identifies edges or outlines of a part of a photograph or complex image.

Figures 8, 9:
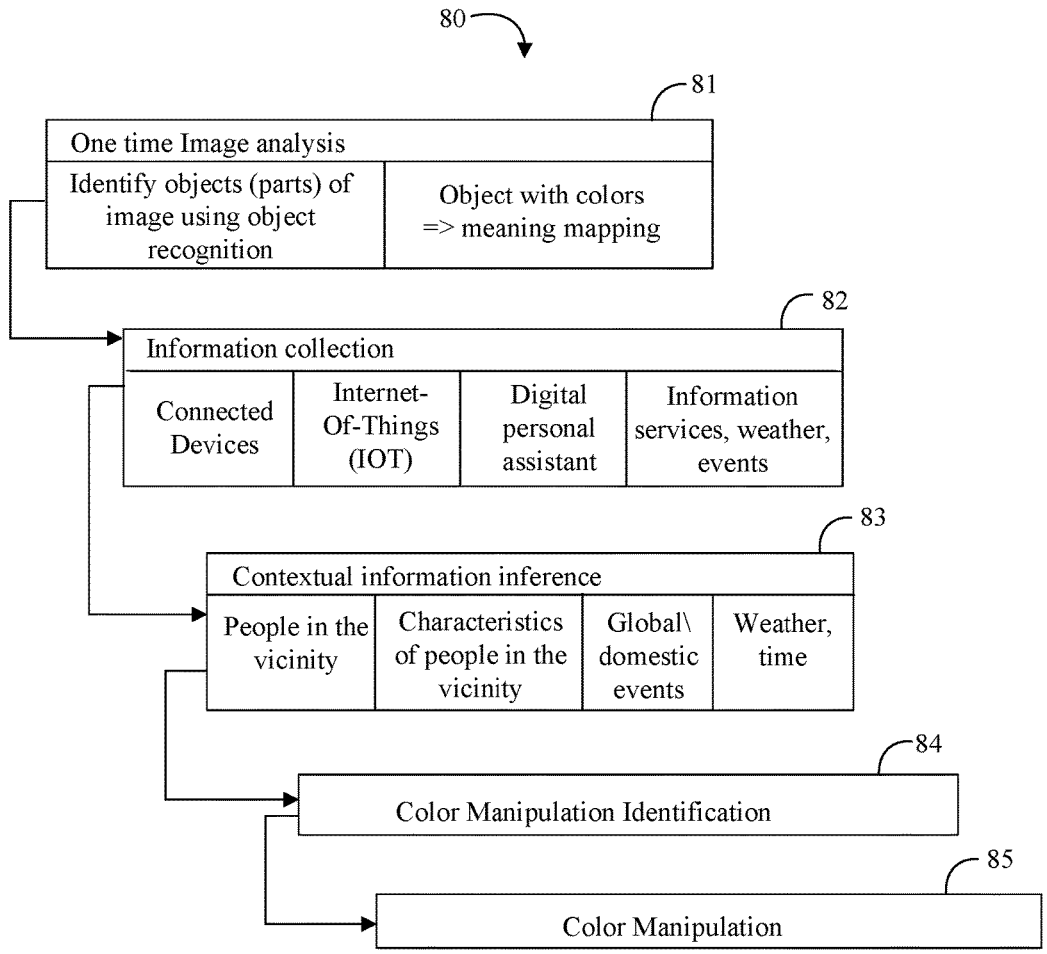
FIG. 8 is a flow diagram of an example of a method of manipulating an image according to an embodiment.
FIG. 9 is a block diagram of an example of a feature-object mapping according to an embodiment.

FIG. 8 shows an example of another embodiment for a method and apparatus 80 for manipulating an image. A one time image analysis at block 81 may be applied to every newly created or displayed image. If the image is part of a repository to which the user has appropriate access rights, the results of the image analysis may be saved to metadata attached to the image file or an external data structure. If the images come from a pre-processed repository, the image analysis information may be read directly from attached metadata without further analysis. For example, the analysis of the image should identify the different segmented parts and object parts in an image for further use. This could be done using object recognition technology. Parts could be identified individually or combined if they come together to one collective object part.

Image part and object part identification may be completely automatic. Alternatively, a user may selectively identify and/or prioritize the image part identification process. For example, user may be presented with a screen including check boxes, pull downs, scroll lists, etc. to pick which types of object parts to include and/or exclude and to select relative rankings/priorities for each object part. Alternatively, the image part and object part identification may include a combination of automatic and manual options. As noted above, the user may interact with the image part identification process to modify the part identifications (which may be done accurately/realistically or whimsically/unrealistically based on the user input).

The one time image analysis block 81 may further include feature-object mapping. For example, a map may be associated between objects and colors where an object in a certain color would have a certain meaning (e.g. generally or to the user). For example, a purple eye in a picture may correspond with a shiner (bruised eye) whereas a white eye may correspond with a normal or healthy eye. With reference to FIG. 9 an example embodiment of matrix 90 may be created to define a different meaning or meanings for object parts in one or more different colors. Identification of this meaning mapping may be manual or may be automated using a more advanced information crawling engine. Although the illustrated matrix 90 is two dimensional, a three dimensional or multi-dimensional matrix or other data structure may be utilized depending on the complexity of the feature-object relationships.

A user may also selectively guide the feature-object mapping process. For example, the user may be presented with a screen including check boxes, pull downs, scroll lists, etc. to pick which types of features to associate with respective object parts. Alternatively, the feature-object mapping may include a combination of automatic and manual options. For example, the user may interact with the feature-object mapping process to modify the mappings (which may be done accurately/realistically or whimsically/unrealistically based on the user input).

Turning back to FIG. 8, an information collection block 82 may collect information from different sources for contextual inference. Non-limiting examples of suitable sources for information collection include connected devices such as an internet-of-things (IOT) device at the picture display location, a digital personal assistant (e.g. which may monitor or infer a mood of the user) gathered information, and various information services such as online weather service, global/domestic/local event information services, rich site summary (RSS) feeds, TWITTER feeds, etc.

Information collection may be completely automatic. Alternatively, a user may selectively guide the information collection process. For example, the user may be presented with a screen including check boxes, pull downs, scroll lists, etc. to pick which types of information to collect. For example, the user may selectively disable information collection from particular connected devices, digital personal assistants, and information services (e.g. no FOX news). Alternatively, the information collection may include a combination of automatic and manual options.

A contextual information inference block 83 may analyze the acquired data (e.g. preferably on the cloud) and infer contextual information such as who is currently in the vicinity of the picture to be displayed, what are the characteristics of people in the vicinity of the picture to be displayed (e.g. age, sex, interests, mood, scheduled events etc.), what global/domestic/local events will be occurring in the near future (e.g. cross-referenced with people's scheduled events), and other information retrieved from information services such as the weather, time etc. Such analysis may occur prior to an image being displayed, and/or an updated analysis for a currently displayed image may be performed based on a change in information or context, periodically, or an update may occur on some other basis. Contextual information inference may be completely automatic. Alternatively, a user may selectively guide the contextual information inference process. For example, user may be presented with a screen including check boxes, pull downs, scroll lists, etc. to pick which types of information to analyze. Alternatively, the contextual information inference may include a combination of automatic and manual options.

A color manipulation identification block 84 may try and match the current contextual information from block 83 with the object parts of currently displayed image (or image about to be displayed) identified using the matrix 90 (see FIG. 9). Such matching may occur prior to an image being displayed, and/or an updated matching for a currently displayed image may be performed based on a change in information or context, periodically, or an update may occur on some other basis. Color manipulation identification may be manual, automatic, or any combination thereof.

A color manipulation block 85 may then use the matching information from the block 84 to color the object according to the identified object-color match and according to the matrix 90 for the purpose of matching the image's colors (or features) with the contextual state. As illustrated, the one time image analysis block 81 is communicatively coupled to the information collection block 82, which is communicatively coupled to the contextual information inference block 83, which is communicatively coupled to the color manipulation identification block 84, which is communicatively coupled to the color manipulation block 85. These connections are illustrative of one example flow, but other connections, process flows, and order of operation are possible. In another embodiment, for example, the contextual information inference block 83, the color manipulation identification block 84, and/or the color manipulation block 85 may benefit from retrieving information directly from the matrix 90 (e.g. from block 81).

For example, an embodiment may convert the image to, or overlay the image with, a scalable vector graphics (SVG) based image. An SVG may be an Extended Markup Language (XML) based image that has properties in accordance with the SVG standard. For example, the PATHS property may hold shape outlines that define areas of an image that in some embodiments may correspond to segmented parts or object parts of the image. The PATHS property may also hold color properties that can be readily modified with a red-green-blue (RGB) specification. For example, modifying the color property of a PATHS instance by modifying a cascading style sheet (CSS) will alter how the image is displayed.

According to an embodiment, an SVG image may have contents with a PATHS property identified as object parts. Information may be collected as described herein, contextual information may be inferred as described herein, and a match may be made between the object parts of the SVG image. Various object-color meanings may be determined based on the contextual information. The CSS may then be modified to have different color properties for the different PATHS properties to change the colors that are displayed to the user. Numerous other techniques for altering an SVG image are also feasible in accordance with an embodiment.

ADDITIONAL NOTES AND EXAMPLES

Example 1 may include a contextual image manipulation apparatus, comprising an image part identifier to identify a part of an image, an information collector to collect information from at least one external source, a context identifier communicatively coupled to the information collector to determine contextual information from the collected information and at least one other contextual source, and an image manipulator communicatively coupled to the image part identifier and the context identifier to alter a feature of the image part based on the contextual information.

Example 2 may include the apparatus of Example 1, further comprising an image analyzer to analyze the image to identify object parts of the image, and a feature-object mapper to map a feature to an object part of the image.

Example 3 may include the apparatus of Example 2, further comprising a storage structure to save relationships between object parts of images and features.

Example 4 may include the apparatus of any one of Examples 1 to 3, wherein the context identifier is further to update the contextual information, and wherein the image manipulator is further to alter the feature of the image part based on the updated contextual information.

Example 5 may include the apparatus of any one of Examples 1 to 3, wherein the external source includes one or more of a connected device, a digital personal assistant, a news feed, a weather service, or a time service.

Example 6 may include the apparatus of any one of Examples 1 to 3, wherein the altered image is to be displayed on a display device and wherein the other contextual source includes one or more of an identification of a person in the vicinity of the display device, a personal characteristic of the person in the vicinity of the display device, or a personal calendar of events of the person in the vicinity of the display device.

Example 7 may include the apparatus of any one of Examples 1 to 3, wherein the feature includes one or more of a color, an applied effect, a skin, a frame, or a metadata.

Example 8 may include the apparatus of any one of Examples 1 to 3, wherein the image part includes one or more of an unrecognized segmented part of the image or a recognized object part of the image.

Example 9 may include a method of manipulating an image, comprising identifying a part of an image, collecting information from at least one external source, determining contextual information from the collected information and at least one other contextual source, and altering a feature of the image part based on the contextual information.

Example 10 may include the method of Example 9, further comprising analyzing the image to identify object parts of the image, and mapping a feature to an object part of the image.

Example 11 may include the method of Example 10, further comprising saving relationships between object parts of images and features.

Example 12 may include the method of any one of Examples 9 to 11, further comprising updating the contextual information, and altering the feature of the image part based on the updated contextual information.

Example 13 may include the method of any one of Examples 9 to 11, wherein the external source includes one or more of a connected device, a digital personal assistant, a news feed, a weather service, or a time service.

Example 14 may include the method of any one of Examples 9 to 11, wherein the altered image is to be displayed on a display device and wherein the other contextual source includes one or more of an identification of a person in the vicinity of the display device, a personal characteristic of the person in the vicinity of the display device, or a personal calendar of events of the person in the vicinity of the display device.

Example 15 may include the method of any one of Examples 9 to 11, wherein the feature includes one or more of a color, an applied effect, a skin, a frame, or a metadata.

Example 16 may include the method of any one of Examples 9 to 11, wherein the image part includes one or more of an unrecognized segmented part of the image or a recognized object part of the image.

Example 17 may include at least one computer readable storage medium comprising a set of instructions, which when executed by a computing device, cause the computing device to identify a part of an image, collect information from at least one external source, determine contextual information from the collected information and at least one other contextual source, and alter a feature of the image part based on the contextual information.

Example 18 may include the at least one computer readable storage medium of Example 17, comprising a further set of instructions, which when executed by the computing device, cause the computing device to analyze the image to identify object parts of the image, and map a feature to an object part of the image.

Example 19 may include the at least one computer readable storage medium of Example 18, comprising a further set of instructions, which when executed by the computing device, cause the computing device to save relationships between object parts of images and features.

Example 20 may include the at least one computer readable storage medium of any one of Examples 17 to 19, comprising a further set of instructions, which when executed by the computing device, cause the computing device to update the contextual information, and alter the feature of the image part based on the updated contextual information.

Example 21 may include the at least one computer readable storage medium of any one of Examples 17 to 19, wherein the external source includes one or more of a connected device, a digital personal assistant, a news feed, a weather service, or a time service.

Example 22 may include the at least one computer readable storage medium of any one of Examples 17 to 19, wherein the altered image is to be displayed on a display device and wherein the other contextual source includes one or more of an identification of a person in the vicinity of the display device, a personal characteristic of the person in the vicinity of the display device, or a personal calendar of events of the person in the vicinity of the display device.

Example 23 may include the at least one computer readable storage medium of any one of Examples 17 to 19, wherein the feature includes one or more of a color, an applied effect, a skin, a frame, or a metadata.

Example 24 may include the at least one computer readable storage medium of any one of Examples 17 to 19, wherein the image part includes one or more of an unrecognized segmented part of the image or a recognized object part of the image.

Example 25 may include a contextual image manipulation apparatus, comprising means for identifying a part of an image, means for collecting information from at least one external source, means for determining contextual information from the collected information and at least one other contextual source, and means for altering a feature of the image part based on the contextual information.

Example 26 may include the apparatus of Example 25, further comprising means for analyzing the image to identify object parts of the image, and means for mapping a feature to an object part of the image.

Example 27 may include the apparatus of Example 26, further comprising means for saving relationships between object parts of images and features.

Example 28 may include the apparatus of any one of Examples 25 to 27, further comprising means for updating the contextual information, and means for altering the feature of the image part based on the updated contextual information.

Example 29 may include the apparatus of any one of Examples 25 to 27, wherein the external source includes one or more of a connected device, a digital personal assistant, a news feed, a weather service, or a time service.

Example 30 may include the apparatus of any one of Examples 25 to 27, wherein the altered image is to be displayed on a display device and wherein the other contextual source includes one or more of an identification of a person in the vicinity of the display device, a personal characteristic of the person in the vicinity of the display device, or a personal calendar of events of the person in the vicinity of the display device.

Example 31 may include the apparatus of any one of Examples 25 to 27, wherein the feature includes one or more of a color, an applied effect, a skin, a frame, or a metadata.

Example 32 may include the apparatus of any one of Examples 25 to 27, wherein the image part includes one or more of an unrecognized segmented part of the image or a recognized object part of the image.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A contextual image manipulation apparatus, comprising:
    an image part identifier to identify an unrecognized segmented part of an image and a recognized object part of the image;
    an information collector to collect information from at least one external source;
    a context identifier communicatively coupled to the information collector to determine contextual information from the collected information and at least one other contextual source; and
    an image manipulator communicatively coupled to the image part identifier and the context identifier to:
        make a first alteration to a visual feature of the unrecognized segmented part of the image based on the contextual information to generate an altered digital image to be displayed to a user on a display device co-located with the user; and
        make a second alteration, independently of the first alteration, to a visual feature of the recognized object part of the image based on the contextual information to generate the altered digital image.

2. The apparatus of claim 1, further comprising:
    an image analyzer communicatively coupled to the image part identifier to analyze the image to identify the unrecognized segmented part of the image and the recognized object part of the image; and
    a feature-object mapper communicatively coupled to the image manipulator to map the visual feature of the recognized object part of the image to the recognized object part of the image.

3. The apparatus of claim 2, further comprising:
    a storage data structure communicatively coupled to the feature-object mapper to save a relationship between the recognized object part of the image and the visual feature of the recognized object part of the image.

4. The apparatus of claim 1, wherein the context identifier is further to update the contextual information, and wherein the image manipulator is to make a further alteration to the visual feature of the unrecognized segmented part of the image based on updated contextual information and to the visual feature of the recognized object part of the image based on the updated contextual information.

5. The apparatus of claim 1, wherein the external source includes one or more of a connected device, a digital personal assistant, a news feed, a weather service, or a time service.

6. The apparatus of claim 1, wherein the altered digital image is to be displayed to the user on the display device in a collection of images, and wherein the other contextual source includes one or more of an identification of a person in the vicinity of the display device, a personal characteristic of the person in the vicinity of the display device, or a personal calendar of events of the person in the vicinity of the display device.

7. The apparatus of claim 1, wherein one or more of the visual feature of the unrecognized segmented part of the image or the visual feature of the recognized object part of the image includes one or more of a color, an applied effect, a skin, or a frame, and wherein the image manipulator is to make a further alteration to a non-visual feature including metadata based on the contextual information.

8. A method of manipulating an image, comprising:
identifying an unrecognized segmented part of an image and a recognized object part of the image;
collecting information from at least one external source;
determining contextual information from the collected information and at least one other contextual source;
making a first alteration to a visual feature of the unrecognized segmented part of the image based on the contextual information to generate an altered digital image to be displayed to a user on a display device co-located with the user; and
making a second alteration, independently of the first alteration, to a visual feature of the recognized object part of the image based on the contextual information to generate the altered digital image.

9. The method of claim 8, further comprising:
analyzing the image to identify the unrecognized segmented part of the image and the recognized object part of the image; and
mapping the visual feature of the recognized object part of the image to the recognized object part of the image.

10. The method of claim 9, further comprising:
saving a relationship in a storage data structure between the recognized object part of the image and the visual feature of the recognized object part of the image.

11. The method of claim 8, further comprising:
updating the contextual information; and
make a further alteration to the visual feature of the unrecognized segmented part of the image based on updated contextual information and to the visual feature of the recognized object part of the image based on the updated contextual information.

12. The method of claim 8, wherein the external source includes one or more of a connected device, a digital personal assistant, a news feed, a weather service, or a time service.

13. The method of claim 8, wherein the altered digital image is to be displayed to the user on the display device in a collection of images, and wherein the other contextual source includes one or more of an identification of a person in the vicinity of the display device, a personal characteristic of the person in the vicinity of the display device, or a personal calendar of events of the person in the vicinity of the display device.

14. The method of claim 8, wherein one or more of the visual feature of the unrecognized segmented part of the image or the visual feature of the recognized object part of the image includes one or more one of a color, an applied effect, a skin, or a frame, and wherein the method includes making a further alteration to a non-visual feature including metadata based on the contextual information.

15. At least one non-transitory computer readable storage medium comprising a set of instructions, which when executed by a computing device, cause the computing device to:

identify an unrecognized segmented part of an image and a recognized object part of the image;
collect information from at least one external source;
determine contextual information from the collected information and at least one other contextual source;
make a first alteration to a visual feature of the unrecognized segmented part of the image based on the contextual information to generate an altered digital image to be displayed to a user on a display device co-located with the user; and
make a second alteration, independently of the first alteration, to a visual feature of the recognized object part of the image based on the contextual information to generate the altered digital image.

16. The at least one computer readable storage medium of claim 15, comprising a further set of instructions, which when executed by the computing device, cause the computing device to:
analyze the image to identify the unrecognized segmented part of the image and the recognized object part of the image; and
map the visual feature of the recognized object part of the image to the recognized object part of the image.

17. The at least one computer readable storage medium of claim 16, comprising a further set of instructions, which when executed by the computing device, cause the computing device to:
save a relationship in a storage data structure between the recognized object part of image and the visual feature of the recognized object part of the image.

18. The at least one computer readable storage medium of claim 15, comprising a further set of instructions, which when executed by the computing device, cause the computing device to:
update the contextual information; and
make a further alteration to the visual feature of the unrecognized segmented part of the image based on updated contextual information and to the visual feature of the recognized object part of the image based on the updated contextual information.

19. The at least one computer readable storage medium of claim 15, wherein the external source includes one or more of a connected device, a digital personal assistant, a news feed, a weather service, or a time service.

20. The at least one computer readable storage medium of claim 15, wherein the altered image is to be displayed to the user on the display device in a collection of images, and wherein the other contextual source includes one or more of an identification of a person in the vicinity of the display device, a personal characteristic of the person in the vicinity of the display device, or a personal calendar of events of the person in the vicinity of the display device.

21. The at least one computer readable storage medium of claim 15, wherein one or more of the visual feature of the unrecognized segmented part of the image or the visual feature of the recognized object part of the image includes one or more of a color, an applied effect, a skin, or a frame, and wherein the computing device is to make a further alteration to a non-visual feature including metadata based on the contextual information.

22. The apparatus of claim 1, wherein the image is to be a scalable vector graphics (SVG) based image including a property that is to hold shape outlines that define areas corresponding to the unrecognized segmented part of the image and the recognized object part of the image.

23. The apparatus of claim 22, wherein the SVG based image is to include one of a converted SVG based image or an overlaid SVG based image, wherein the SVG based image is to include a property corresponding to color, and wherein a storage data structure is to include an object-color meaning determined based on the contextual information.

24. The apparatus of claim 6, wherein the display device is to include a digital photo frame function, wherein the collection of images is to include a slideshow format, and wherein the image is to include one or more of a digital drawing or a digital photograph.

\* \* \* \* \*